UNITED STATES PATENT OFFICE.

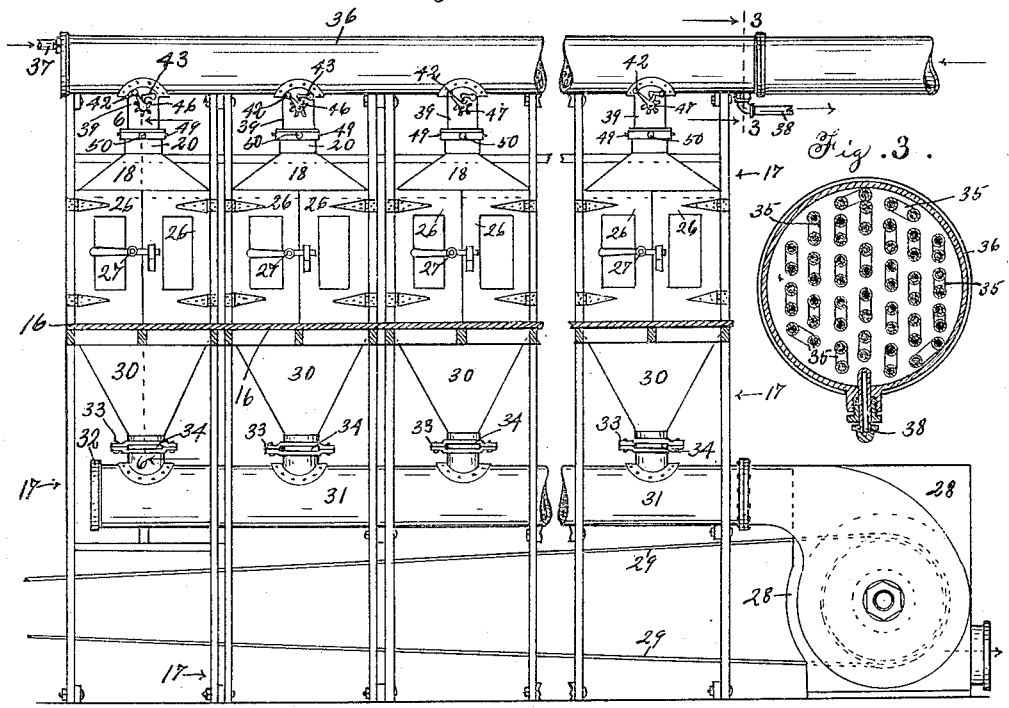

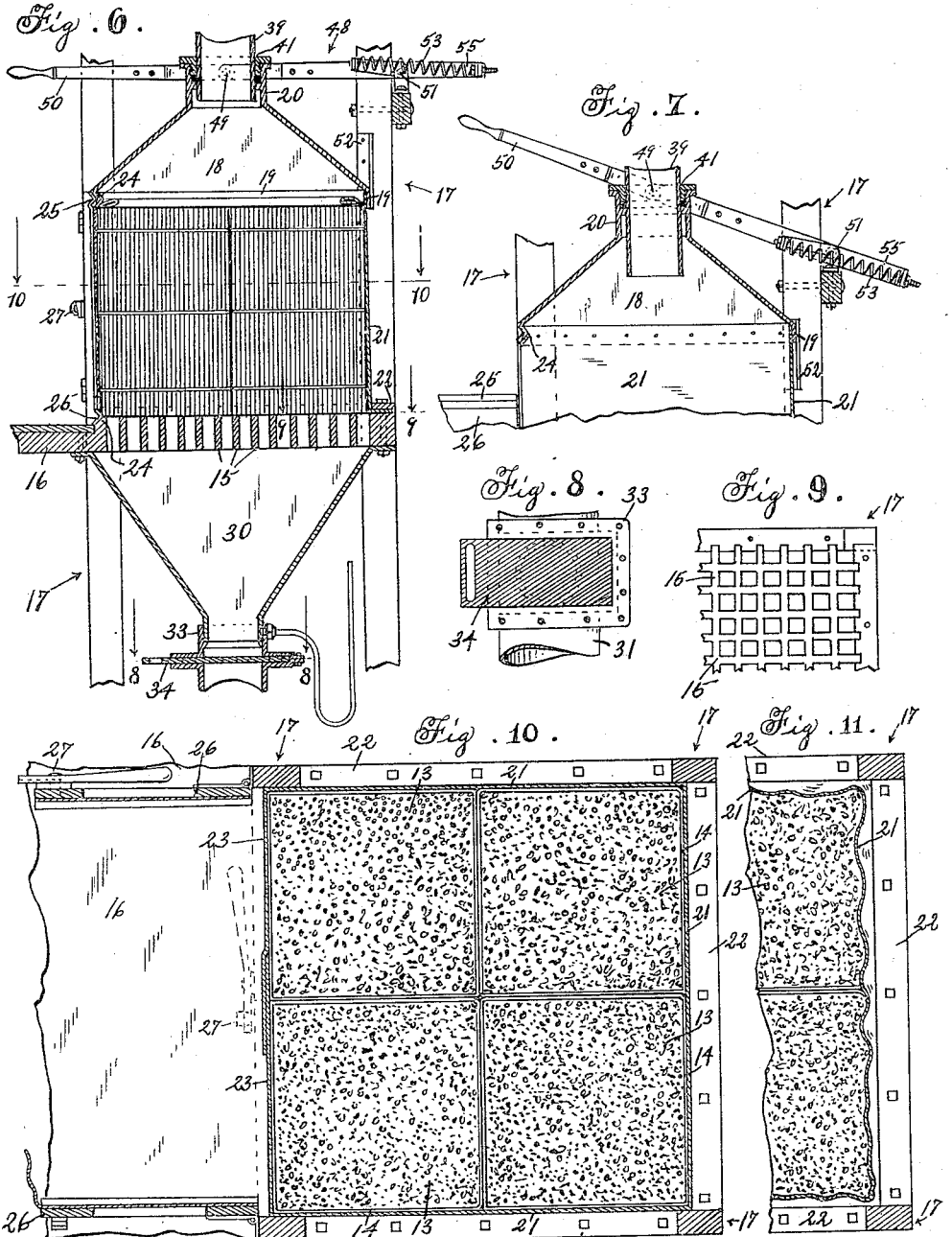

JUSTIN KAY TOLES, OF SAN FRANCISCO, CALIFORNIA, ASSIGNOR TO WILLIAM R. BROWN, OF DETROIT, MICHIGAN.

DRYING APPARATUS.

1,124,186. Specification of Letters Patent. Patented Jan. 5, 1915.

Application filed April 14, 1913. Serial No. 761,054.

*To all whom it may concern:*

Be it known that I, JUSTIN KAY TOLES, a citizen of the United States of America, residing at San Francisco, county of San Francisco, State of California, have invented a certain new and useful Drying Apparatus; and I do hereby declare the following to be a full, clear, and exact description of the invention, such as will enable others skilled in the art to which it appertains to make and use the same.

This invention relates to a drying apparatus, which, though useful to dry various materials, is more particularly adapted to be used to dry highly compressed bales of flax.

Heretofore retted flax has been dried spread out in the open air at considerable expense and loss of time especially when fogs, rain or snow intervene. To dry the flax in an open drier would require the use of a great amount of heat and the movement of large volumes of air throughout an extended area.

One object of this invention is to provide a novel and improved drying apparatus in which the whole current of air is constrained to pass directly through the compressed bales of flax notwithstanding variations in the bulk of the flax as it is being dried.

A further object of the invention is to provide a novel and improved apparatus in which atmospheric pressure acting on the sides of the bales of flax assists the suction operation in effecting the withdrawal of moisture from the flax.

Further objects of the invention are to provide a novel and improved drying apparatus which is simple and compact, economical to manufacture, install and maintain, convenient and effective to use, well adapted to save time, labor and expense in operation, and which permits of any one of a plurality of the drying units being put into or out of service while the others are in operation so that the work of handling and drying the bales of flax can be carried on in a continuous manner without loss of time by a comparatively small force of operatives.

With the above and other objects in view, the invention consists of an improved drying apparatus the advantages of which will be apparent to those skilled in the art from a consideration of the accompanying drawings together with the following description of one form of apparatus.

Referring to the drawings: Figure 1 is a partly broken and sectional view of the apparatus in elevation; Fig. 2 is a broken plan view of the apparatus, with parts omitted; Fig. 3 is a cross-sectional view taken on the line 3—3 of Fig. 1; Fig. 4 is an enlarged fragmentary view showing the damper; Fig. 5 is an enlarged cross-sectional view taken on the line 5—5 of Fig. 4; Fig. 6 is a partly broken enlarged sectional view taken on the line 6—6 of Fig. 1; Fig. 7 is a fragmentary view of parts shown in Fig. 6, in raised position; Fig. 8 is an enlarged fragmentary view taken on the line 8—8 of Fig. 6, showing the sliding damper in section; Fig. 9 is an enlarged fragmentary view of the floor; Fig. 10 is an enlarged sectional view taken on the line 10—10 of Fig. 6, the doors being shown in open position; Fig. 11 is a fragmentary view showing the flexible envelop pressed against the sides of the bales of flax by atmospheric pressure, and Fig. 12 is an enlarged fragmentary view of the means for raising the hood.

The flax is highly compressed in bales 13 and preferably four of the bales 13 are tightly bound together by wires 14 and then placed on a perforated floor 15 which is disposed adjacent to a platform 16; the floor 15 and the platform 16 being arranged on a suitable framework 17. At a suitable distance above the floor 15 is arranged a hood 18 the lower end portion 19 of which is of approximately the same dimensions as that of the four bales 13 of flax and the upper end portion 20 of which is preferably of reduced size and tubular in form. On the interior of the lower end portion 19 of the hood, except at the front thereof, is suitably secured the upper end portion of a flexible moisture and air proof envelop 21— preferably consisting of rubber or rubber coated sheeting—which envelop has the lower end portion thereof secured, preferably by battens 22, at the sides of the floor 15 except the front. The envelop 20 is of such size that it is adapted to be drawn tightly against the sides of the bales 13 and closely hug the same—notwithstanding change of bulk of the flax during the drying operation—to constrain the air to move directly through the bales. At the front, the free end portions 23 of the envelop are free and adapted to be parted to permit placing the bales of flax within the envelop, and then folded over against the bales of flax—see Fig. 10—whereupon the upper and lower ends of the portions 23 may be secured in V-grooves 24 on the hood 18 and floor 15 by means of V-battens 25 on the hinged frames 26 which latter may be held together by a suitable latch 27.

Moisture is drained from the bales of flax by air passing therethrough due to the action of a suitable suction pump 28 which may be driven by a belt 29; a closed passageway 30 being affixed to the bottom of the floor 15 and in communication with the suction pump 28. When—as shown in this instance—a battery of drying units is made use of, the passageways 30 may be connected with a manifold 31 which is provided with a cap 32 on one end thereof and has its other end connected to the suction pump 28. A manometer 33 may be affixed on the passageway 30, and the latter may have suitably arranged therein a sliding valve or damper 34. The air may be heated by steam pipes 35 arranged within a shell 36 and connected with intake pipe 37 and with exhaust pipe 38. A pipe 39, having arranged therein a pivotally mounted damper 40, may have one end thereof connected to the shell 36 and have its other end connected to the upper end portion 20 of the hood by means of a slip-joint 41. The damper 40 has thereon a handle 42 and may be locked in adjusted position by means of a pivoted dog 43 provided with a projection 44 adapted to fit between the teeth 45 on a wheel 46 mounted fast on the shaft 47 of the damper 40.

Means whereby the hood 18 may be raised out of the way when the bales of flax are being placed in position on the floor 15 within the envelop 21, may consist of the lever 48 which latter is mounted on a pivot 49 on the upper end portion 20 of the hood and has a handle 50 on its front end and has its rear end mounted on a suitable pivot 51; angle-irons 52 suitably affixed on the framework 17 being adapted to guide the hood when the latter is being moved. The hood 18 may be held in raised position by means of a spring 53 which has one end thereof affixed to a forwardly extending stationary arm 54 and has the other end thereof affixed to an offset 55 on the lever 48 at the rear of the pivot 51.

From the foregoing, the operations and advantages of the drying apparatus will be readily understood by those skilled in the art. A large number of bales of flax can be dried at the same time, the flax preferably being disposed lengthwise in the bales. When the bales of flax are placed in one of the stalls, chambers or drying units, the envelop 21 may be adjusted and closed at the front of the stall then the dampers 34 and 40 may be opened and the suction pump 28 operated. The action of the suction pump causes a partial vacuum within the envelop 21 so that the latter is forced by atmospheric pressure to snugly hug and press against the sides of the bales of flax so that the heated air cannot take a path of lesser resistance than that directly through the flax. When the flax in any one of the stalls is dry, it may be replaced by a wet charge of flax without disturbing that in the other stalls, thus with a comparatively small number of operatives large capacity results can be attained notwithstanding the apparatus is simple and occupies a comparatively small area. The flax being highly compressed in bales before or after retting is handled with facility and despatch and after the flax is dried the bale need not be broken until it is desired to decorticate the flax.

I claim:

1. Apparatus for drying compressed bales of flax, comprising a perforated floor, a hood, a flexible envelop affixed to the hood and to the floor, means for admitting substantially dry air through the hood to the bales of flax in the flexible envelop, and means for pumping moist air from the bales of flax.

2. In apparatus for drying wet material, the combination of a chamber to receive the wet material, said chamber provided with flexible moisture and air proof walls, means for admitting substantially dry air to the chamber, and means for withdrawing moist air from the chamber.

In testimony whereof I have signed my name to this specification in the presence of two subscribing witnesses at San Francisco, county of San Francisco, State of California, this 4th day of April, A. D. 1913.

JUSTIN KAY TOLES.

Witnesses:
 E. B. STEWARD,
 E. M. SOMERVILLE.

Copies of this patent may be obtained for five cents each, by addressing the "Commissioner of Patents, Washington, D. C."